May 15, 1923.

M. C. CRAWLEY

TYPEWRITING MACHINE

Filed July 25, 1922

INVENTOR
Manfried C. Crawley
BY Davis & Davis
ATTORNEYS

May 15, 1923. 1,455,112

M. C. CRAWLEY

TYPEWRITING MACHINE

Filed July 25, 1922     6 Sheets-Sheet 3

INVENTOR
Mansfield C. Crawley
BY Davis & Davis
ATTORNEYS

May 15, 1923.
M. C. CRAWLEY
TYPEWRITING MACHINE
Filed July 25, 1922
1,455,112
6 Sheets-Sheet 4
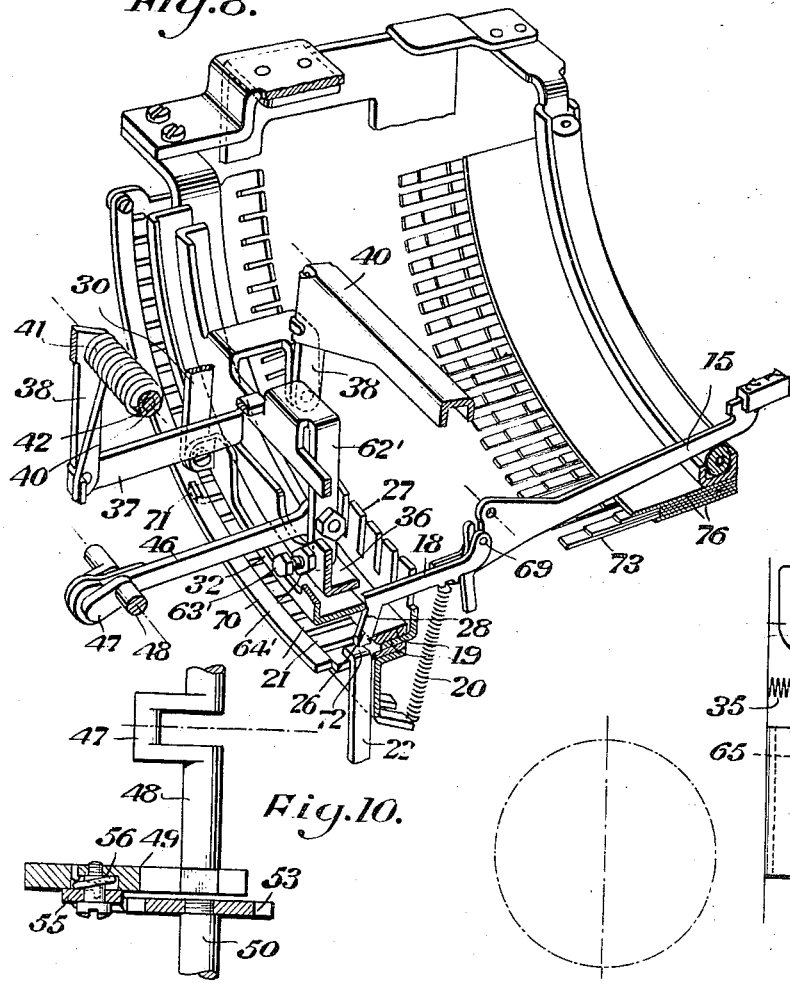
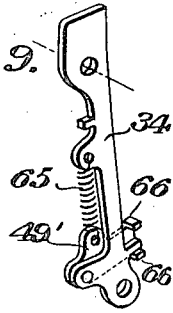
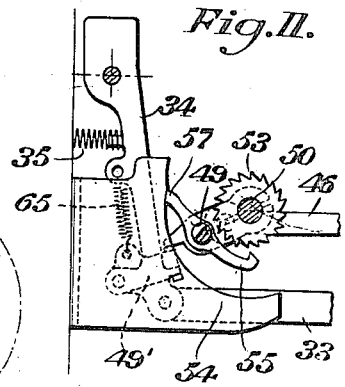
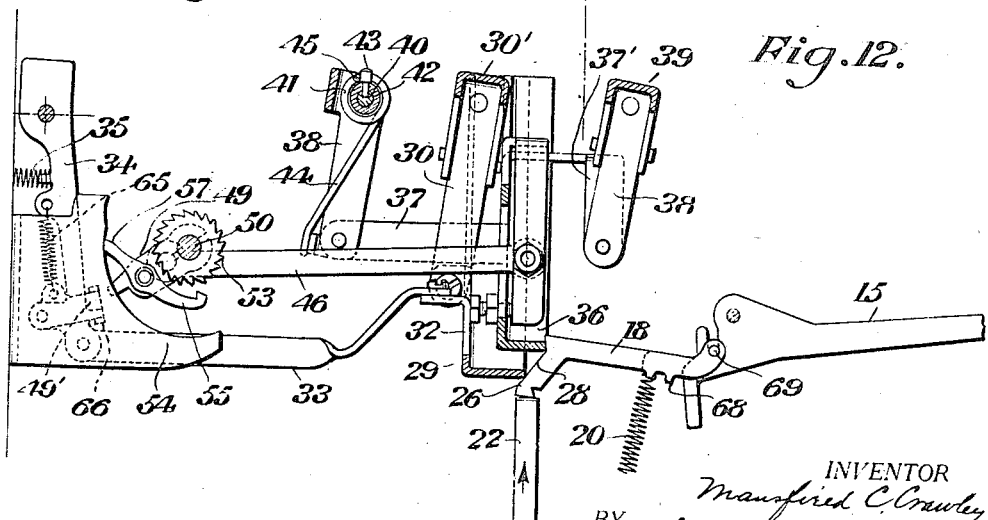
INVENTOR
Manfred C. Crawley
BY Davis & Davis
ATTORNEYS

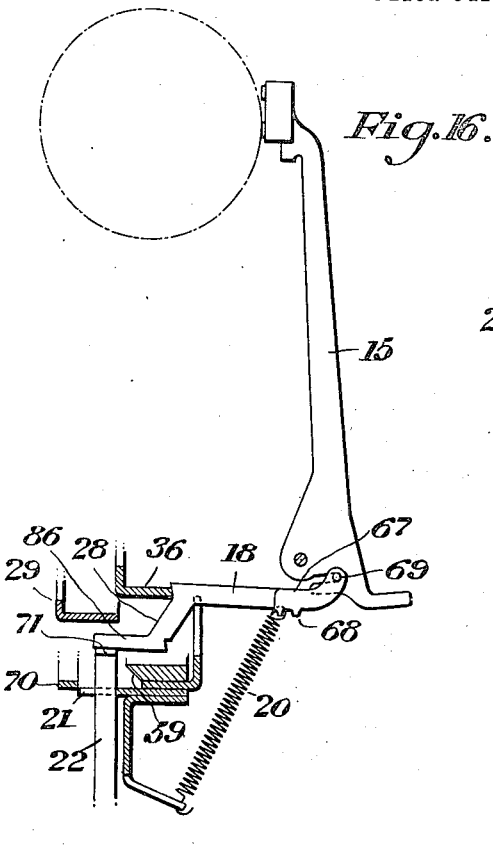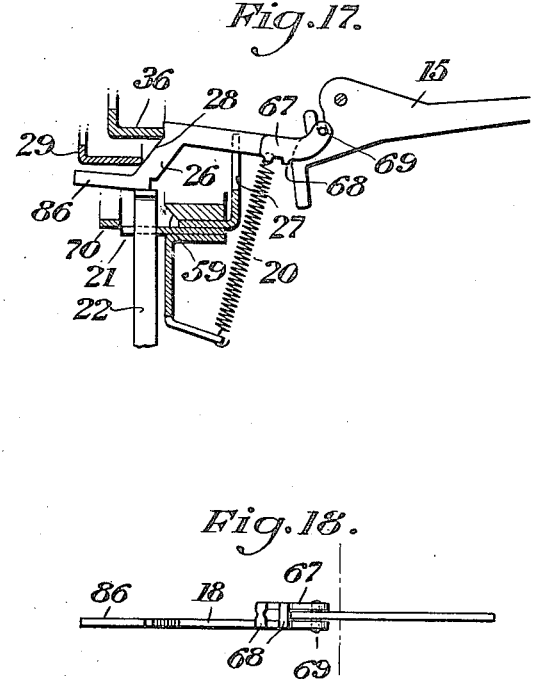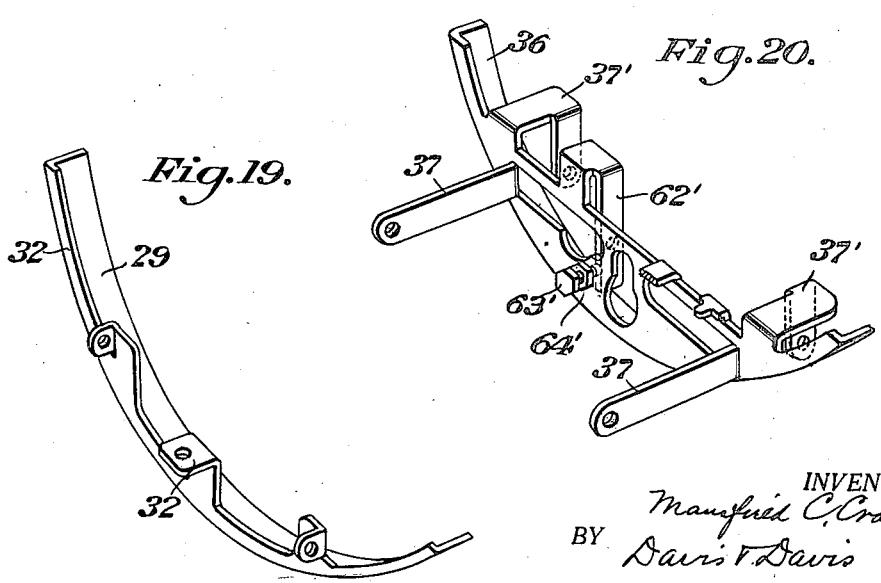

Patented May 15, 1923.

1,455,112

UNITED STATES PATENT OFFICE.

MANSFIELD C. CRAWLEY, OF GROTON, NEW YORK, ASSIGNOR TO ADDOGRAPH COMPANY, OF LOS ANGELES, CALIFORNIA, A CORPORATION OF CALIFORNIA.

TYPEWRITING MACHINE.

Application filed July 25, 1922. Serial No. 577,362.

*To all whom it may concern:*

Be it known that I, MANSFIELD C. CRAWLEY, a citizen of the United States of America, and a resident of Groton, county of Tompkins, and State of New York, have invented certain new and useful Improvements in Typwriting Machines, of which the following is a specification.

This invention has relation to that type of typewriting machines covered by my former Patent No. 1,156,061, dated October 12, 1915, wherein a continuously-running, preferably electric, motor is employed for retracting a curved universal type-bar-actuator after said actuator has been projected forwardly on its working-stroke by means of a spring, automatic devices being provided to latch the actuator in cocked position and free the motor from the retracting devices, and each type-bar being, in the preferred construction, provided with a separate coupler or push-bar which is adapted to be raised into the path of the universal actuator by means of its associated key, there being provided also a release device which, at the same time a printing key is operated, is actuated to release said latch and thus permit the type-bar-actuator to fly forward on its working-stroke. The present invention has for its object to generally improve the construction and operation of this mechanism, as more fully hereinafter set forth, but it will be observed by the scope of the appended claims that all the features are not restricted to this type of machine.

In the drawings—

Figure 1:
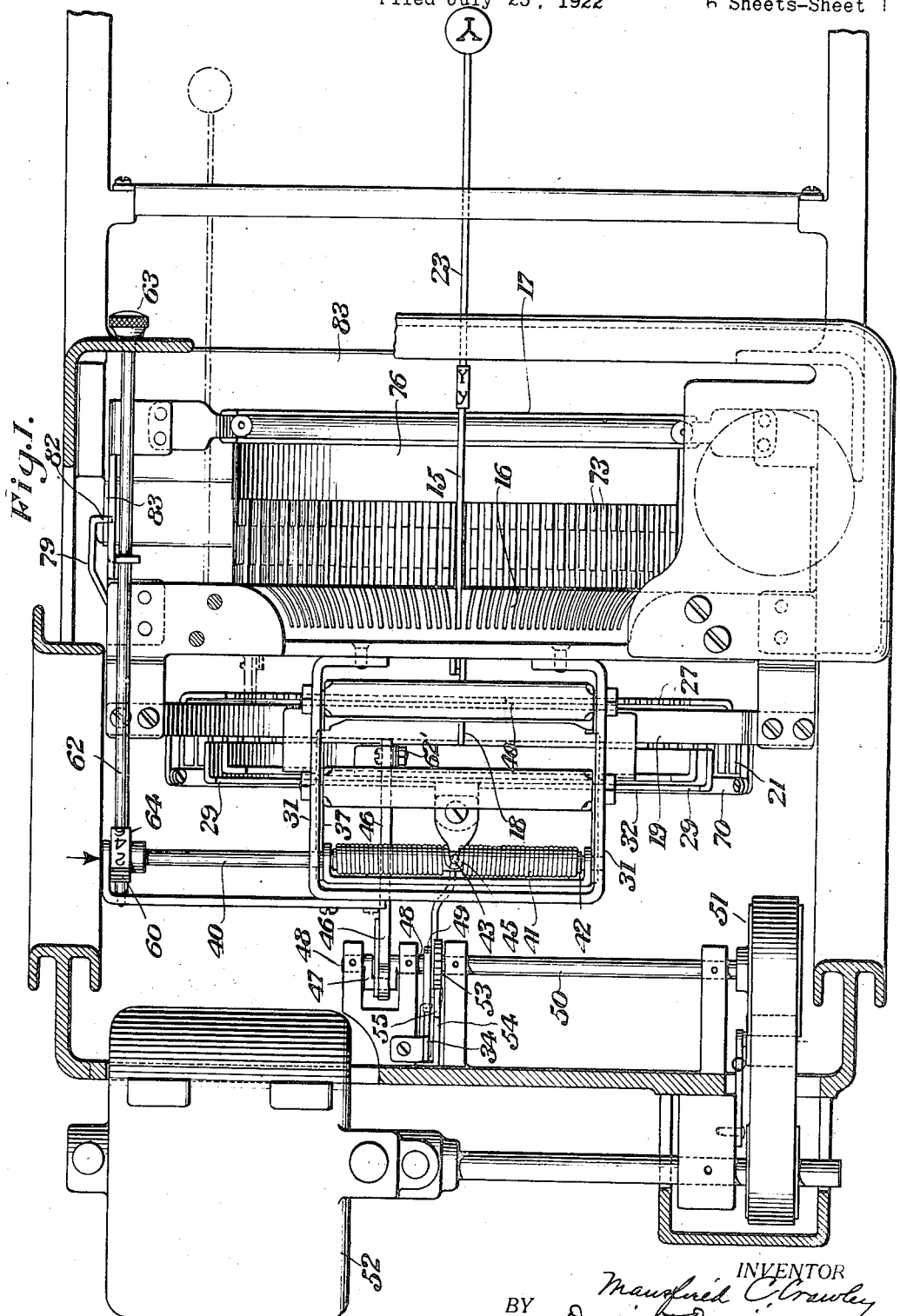
Fig. 1 is a plan view, partly in section, of a typewriting machine embodying my present improvements.
Figure 2:
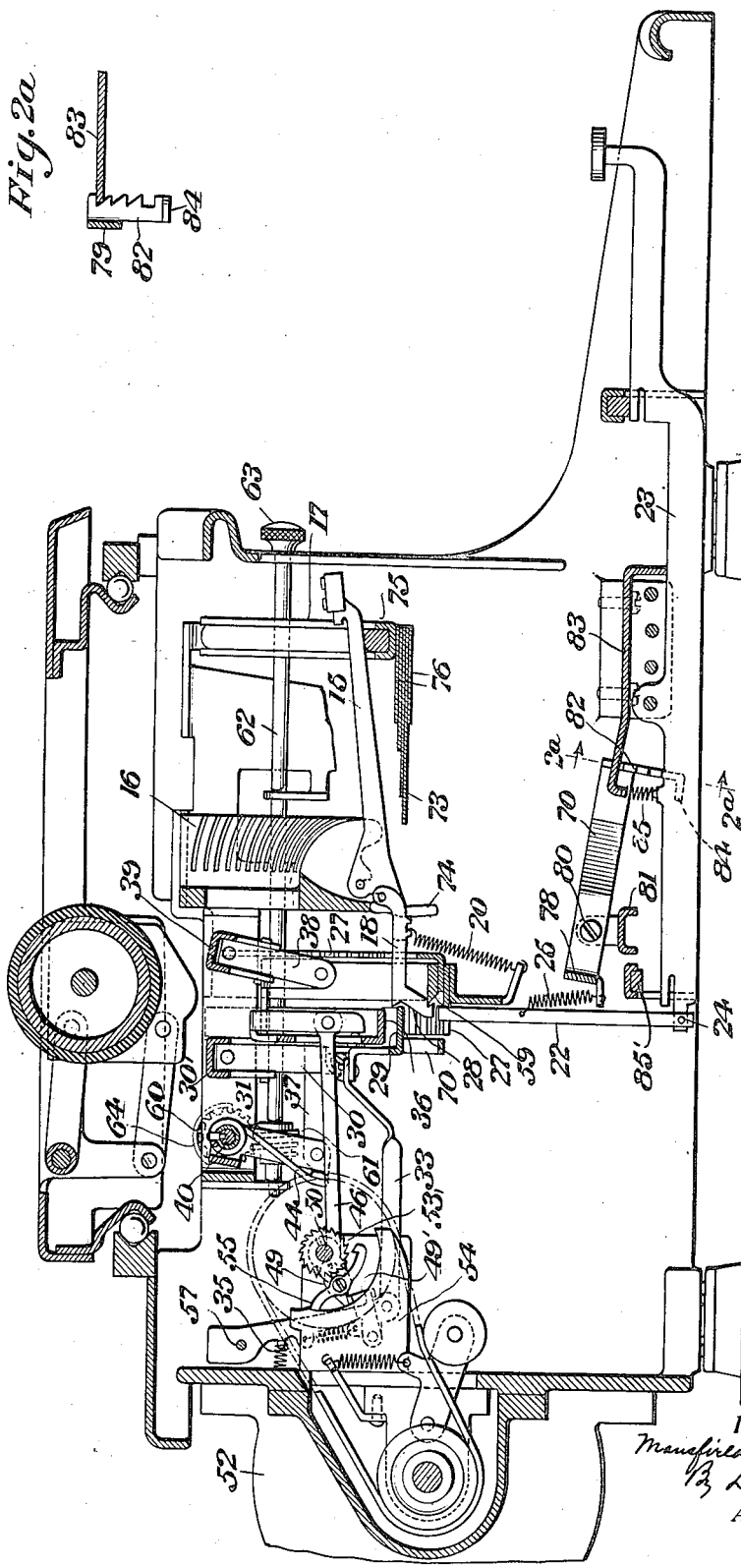
Fig. 2 is a vertical longitudinal sectional view of the same.
Figure 3:
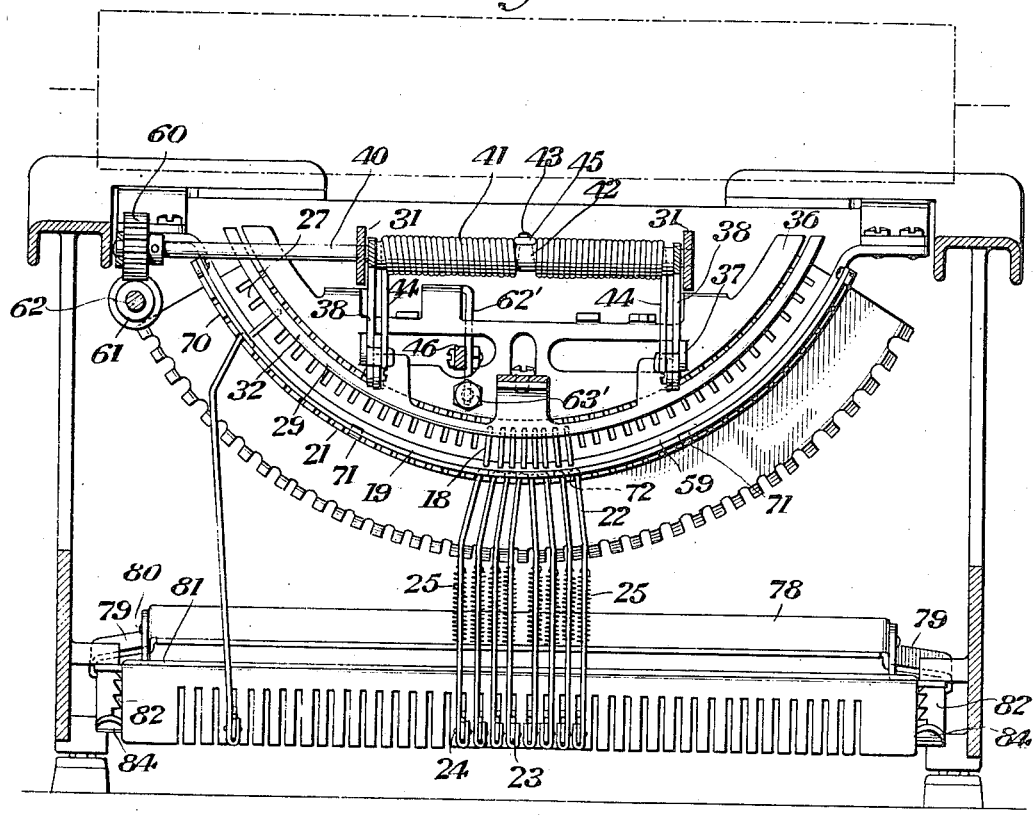
Figure 4:
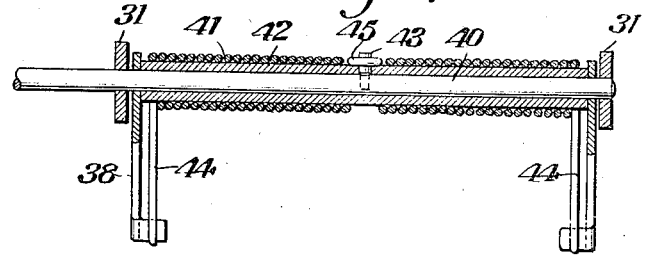
Figure 5:
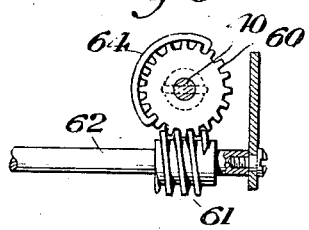
Figure 6:
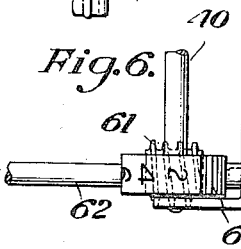
Figure 7:
Figure 13:
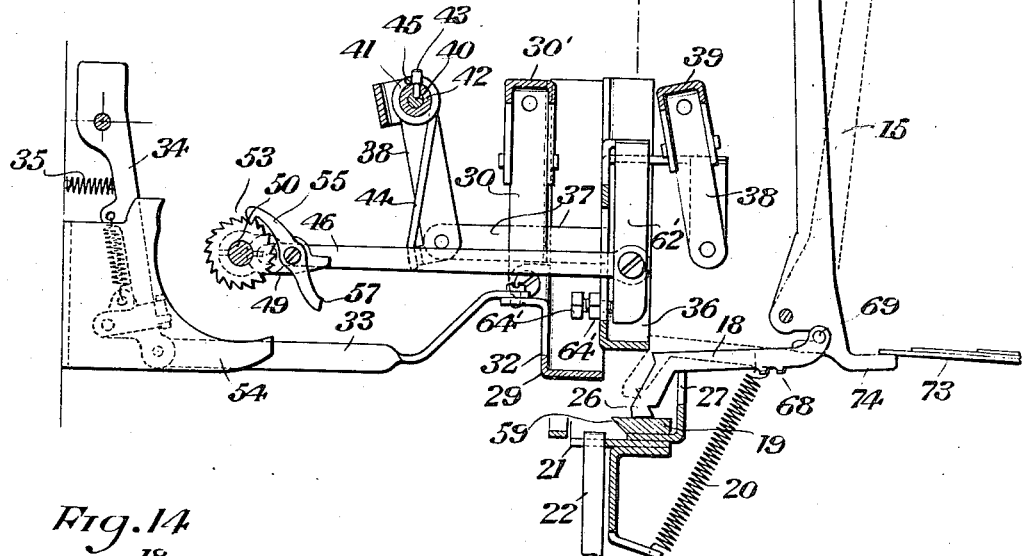
Figure 14:
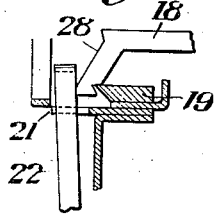
Figure 15:
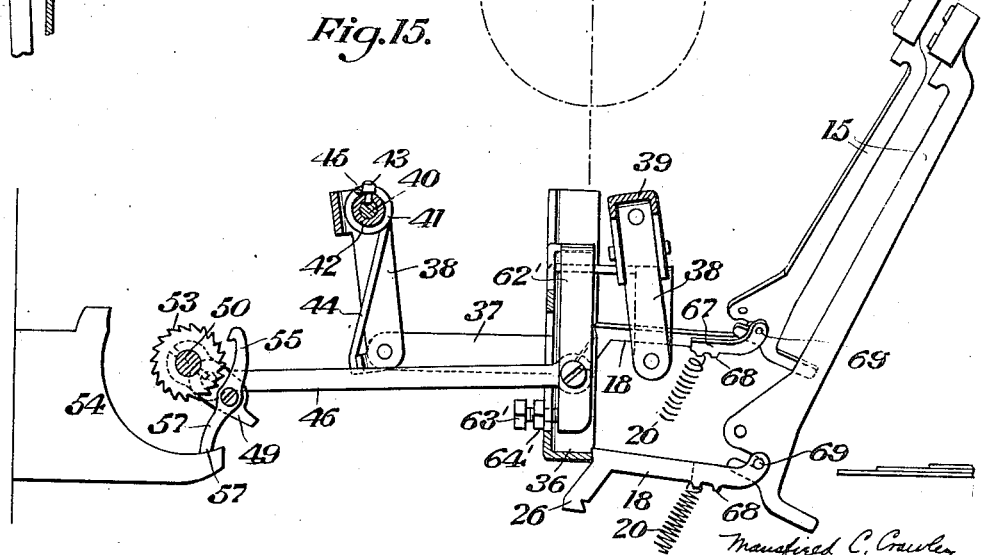

Fig. 2ª is a view of details hereinafter described;

Fig. 3 is a transverse sectional view of the machine;

Fig. 4 is a detail view, partly in section, of the spring arrangement for actuating the type-bar-actuator;

Figs. 5, 6 and 7 are views of details of the tensioning device for the spring of the type-bar-actuator;

Fig. 8 is a perspective view showing some of the details of the type-bar-actuating mechanism;

Figs. 9, 10, 11 and 12 are views showing details of the mechanism for pulling back and latching the type-bar-actuator;

Fig. 13 is a vertical sectional view showing the type-bar-actuator mechanism at the forward limit of its movement;

Fig. 14 is a detail of the rebound lock;

Fig. 15 is a view similar to Fig. 13 showing what happens when two of the type-bars are accidently adjusted into position for actuation by the type-bar-actuator;

Figs. 16, 17, 18, 19 and 20 are views showing details hereinafter more particularly described.

Referring to the drawings by reference-characters, 15 designates the type-bars which are of the usual form and pivoted to the usual segment 16 and have their head-ends normally resting upon a type-bar-rest 17. Each type-bar has pivotally connected to it a rearwardly-extending coupler 18 whose rear end rests upon a coupler-rest 19 consisting of a bar extending across the machine and curved to correspond with the curvature of the segment 16, a coil-spring 20 being employed to normally hold the type-bar with its head against rest 17 and its coupler against the upper face of said coupler-rest 19.

The rear edge of the coupler-rest 19 is provided with a series of spaced notches forming a multiplicity of rearwardly-extending fingers 21 between which are adapted to slide the upper ends of a series of rods or bars 22 arranged in a row across the machine, one rod being provided for each of the key-levers 23, its lower end being pivoted at 24 to its associated key-lever and a light coil-spring 25 being employed to pull the upper end of the rod 22 forwardly against the body of the coupler-rest 19, this spring 25 serving also to normally hold down rod 22.

The rear end of each coupler 18 is provided with a hook 26 which extends downwardly and rearwardly and has its lower end resting upon the coupler-rest 19 immediately above the upper end of one of the rods 22 so that when said rod is raised by the key, it will lift the coupler a limited distance. The couplers are guided in their up-and-down movement by means of a series of fingers 27 extending upwardly from the front edge of the coupler-rest 19.

The couplers 18 as well as their guide-fingers 27 are, of course, radially arranged to correspond with the radial paths of movement of the type-bars. Each coupler is provided with a cam surface 28 which, when the coupler is raised, is adapted to impinge against and impart a rearward movement to the universal release-bar 29 curved to correspond with the curved arrangement of the fingers 21 and suspended immediately above these fingers by means of a pair of depending links 30, these links being pivoted at their upper ends to a pair of horizontal frame-bars 31 by means of a rock-shaft 30′ journaled at its ends therein, the lower ends of these links 30 being pivotally connected to the arcuate bar 29 by means of a flange 32 and this flange 32 being pivotally connected by a horizontal link 33 to the depending end of a latch-lever 34 arranged near the rear wall of the machine and adapted to be normally swung forwardly by means of a spring 35.

Arranged above the universal release-bar 29 is a similarly-curved universal type-bar-actuator-bar 36 which is suspended by means of a depending link arrangement composed in part of two pairs of parallel depending arms 38. Pivotally connected to the rear pair of the arms 38 are the rear ends of a pair of arms 37 projecting rearwardly from the actuator-bar 36; and pivotally connected to the forward pair of arms are the forward ends of arms 37′ projecting forwardly from the actuator-bar. For low cost of manufacture, the bar 36 and its connected arms are desirably constructed of a single piece of sheet-metal cut and stamped to shape. The front pair of arms 38 is affixed to a sheet-metal rock-shaft 39 journaled by pivot-screws in the aforesaid frame-bars 31, and the rear pair is pivotally hung on a cylindrical rock-shaft 40 likewise journaled in said bars 31. The type-bar-actuator thus constructed is normally pressed forwardly toward the couplers 18 by means of a double coil-spring 41 which surrounds a sleeve 42 mounted on and adapted to turn with shaft 40, this sleeve and shaft being locked together by a radial pin 43, the ends of said sleeve 42 serving to properly confine the upper ends of the arms 38 loosely against the adjacent sides of the frame-bars 31. The opposite ends of this double spring 41 are extended downwardly at 44 and arranged to bear upon the rear faces of lugs on the respective arms 38 so that the normal tendency of the spring is to swing said arms 38 forwardly. The spring is fastened to the shaft 40 by means of the aforesaid pin 43, which pin extends through a loop 45 formed in the spring midway its length, said loop being hooked over the radially-projecting end of said pin and being held against the pin by the tension of the spring. This manner of connecting the spring to the shaft 40 converts the spring virtually into two springs which, altho independent in a sense, are at the same time of equal power, so that the pressure upon both arms 38 is practically the same. The shaft 40 is locked against rotation and is adapted to be rotatively adjusted to vary the tension upon the spring by means hereinafter described.

The actuator-frame is connected pivotally by means of a link 46 to a crank-arm 47 formed on a short shaft 48 journaled in suitable brackets on the rear wall of the machine, one end of said shaft being provided with a radial arm 49 which lies in the path of the lower end of the latch-lever 34, so that when said shaft 48 is rotated over backwardly the outer end of said arm 49 will be caught by a spring-held latch-lug 49′ carried by said latch-lever. Adjacent to and in alinement with the aforesaid shaft 48 is another, independent shaft 50 which is adapted to be continuously driven by means of a pulley 51 belted to a continuously-running motor 52, said shaft 50 being provided with a pull-back ratchet-wheel 53 which is positioned close to the radial arm 49 on the shaft 48. Affixed to the frame of the machine is a cam 54 which extends forwardly and curves under the ratchet-wheel 53. A pawl 55 is pivotally mounted on the radial arm 49 in the path of the ratchet-wheel 53, a spring 56 being provided to normally throw this pawl into engagement with the ratchet-wheel, said pawl being provided with a heel projection 57 which is adapted to come in contact with the inner curved edge of the cam 54 to withdraw the pawl from the ratchet-wheel just prior to the engagement of the radial arm 49 with the latch-lever. This mechanism is substantially the same as employed in my aforesaid patent, the operation being briefly as follows:

While the machine is in use, the ratchet-wheel 53 is maintained in continuous rotation over backwardly. Normally, the outer end of pawl-carrying arm 49 is held against rotation under the force of the spring 41 by means of the latch 34. When this arm 49 is released by the rearward swinging of the latch 34 through the medium of the key-operated release-bar 29, the actuator spring 41 quickly throws the type-bar-actuator forwardly and this actuator strikes the selected coupler and thus throws the type-bar to the platen. The cam 54 holds the hook-pawl 55 out of engagement with the spinning ratchet-wheel 53 until the heel 57 of the pawl rides off the forward end of the cam, by which time the actuator has about completed its forward stroke. When the pawl is thus released from the cam, its spring 56 forces it quickly into engagement with the ratchet-wheel, whereupon the type-bar-actuator-frame is quickly pulled back. As the pivotal point between crank 47 and link 46 passes below center, the heel of the pawl impinges against the rear end of the cam and thus withdraws the pawl from the ratchet, allowing the ratchet-wheel to run free of the pawl, and the outer end of the pawl-carrying arm 49 is then arrested at a point slightly below center by the latch. The difference between the present mechanism and the one disclosed in my aforesaid patent for thus pulling back, i. e., cocking, the type-bar-actuator is that in the present mechanism the pawl-carrying arm 49 and the crank 47 are mounted on an independent shaft 48, this shaft 48 being alined with the main driving-shaft 50. This construction provides a more substantial bearing for the crank-arms 49 and 47 and relieves the parts entirely of wear until they are brought into action by a keyboard operation.

To avoid rebounding of the type-bars after they settle to normal position after an operation, I provide the coupler-rest 19 with a rearwardly-facing shoulder 59 immediately in front of the line on which the hooked ends of the couplers come to rest, said rear ends of the couplers resting normally on the coupler-rest. When the couplers come to rest, their shouldered ends drop down behind this shoulder 59 and the couplers are thus prevented from rebounding forwardly when the type-bar-head strikes the rest 17. Desirably, the face of the shoulder 59 is inclined upwardly and rearwardly slightly, and the engaging face of the coupler hook is similarly inclined so as to thereby cause the shoulder not only to act as a stop for the coupler, but to also act as a hook to hold it down on the rest in exact position for a subsequent operation. This rebound device is especially important where a type-bar is operated a second time immediately, as in such cases it is of course imperative that the coupler shall come to rest in exact position immediately. It will be obvious that all the couplers must be in exactly the same position relatively to the actuator in order that a uniform printing operation shall be obtained; this anti-rebound device insures this. The particular advantage of the specific construction employed is that the coupler is brought to rest in its proper position in an exceedingly brief space of time, this quickness being so great that the potential speed of the machine is always ahead of the possible speed of the operator. In actual practice, the actuation of the type-bar to printing position and the reciprocation of the parts to normal has been found to be so quickly done with the mechanism disclosed that it has been impossible to manually manipulate a single key fast enough to interfere with the restoration of the type-bars and couplers to exact normal position.

It will be observed that the link 46 and the crank 47 not only serve as a positive means for retracting the actuator, but also serve as a positive means for limiting the extent of the working-stroke of the actuator, thereby insuring an exact predetermined forward throw of the actuator. It will be observed that the proportions of the parts are such that the type-bars are released from the actuator before the type strikes the platen, so that the last part of the stroke of the type-bars will be a momentum or flying stroke. In this way, that is, by thus letting the type-bars fly to the platen by momentum rather than by forcing them to the platen by a positive pushing action, a sharpness and lightness of blow against the platen is obtained that has been sought for but is practically unobtainable in a manually-operated machine. This arrested movement of the type-bar-actuator is shown in Fig. 13, in which figure the dotted lines show the position of the type-bar and its coupler at the instant the actuator is arrested. From this point, the type-bar moves to the platen by momentum. This point of arrestment may be, of course, varied; in practice I have found that the type may be carried to a point very close to the platen before being released, it being simply essential that the arrestment shall take place before the type comes in contact with the platen. The instant the coupler is released from the actuator, its spring 20 begins to swing it downwardly toward the upper surface of the coupler-rest 19, as shown in full lines in Fig. 13, so that during the time the type-bar is returning to rest the coupler is sliding rearwardly on the upper face of the coupler-rest till its tail end finally drops down behind the rebound-shoulder 59.

Another feature of importance is that in the present invention the universal release-bar 29 is mounted in such manner as to have practically a bodily horizontal movement, whereas in my former patent this release-bar was in the form of a bail pivoted to the frame of the machine near the base thereof so as to swing on an arc of considerable length. This upstanding-bail construction was objectionable because the upturned ends of the release-bar had to move a greater distance rearwardly to release the latch than the middle portion of the release-bar. The present construction was devised to avoid this, as it is obviously desirable that at whatever point throughout the length of the release bar the coupler engages it, it should be actuated a uniform distance so as to bring about a disengagement of the latch at exactly the same moment for all the keys and at the same time enable all the couplers to be made exactly alike to thereby simplify manufacture and assembly. The universal release-bar in the present construction is mounted on depending links, the forward links being designated by 30 and the rear link being the latch 34 which thus serves in addition to its latching function as a suspension link for the release-bar. The links 30 are of substantially the same length as the latch 34, so as to thereby insure an easy back-and-forth swing of the release-bar by eliminating all binding action at the several pivotal points. There will, of course, be a slight up-and-down movement of the release-bar during its reciprocating movement, but this will be so slight as to be negligible, since as a matter of fact even the fore-and-aft bodily movement of the release-bar is exceedingly slight, it being unnecessary in practice to shift more than an eighth of an inch or so.

In a machine of this type, namely, where the operation of the keys is a rather delicate matter, in that it consists merely in lightly depressing the key-levers, and the printing is so very quickly done by the spring-actuated mechanism, it is desirable that some means be provided to stop the machine in those instances where two or more keys are accidentally operated simultaneously. My construction lends itself nicely to accomplishing this purpose. I have discovered that this may be done by making the actuator-spring 41 strong enough to actuate but one type-bar and not strong enough to actuate two type-bars against the pull exerted by their return springs 20. When a spring of that strength is provided and two couplers are shifted into position at the same time, the actuator-bar strikes both couplers and moves both type-bars part way to the platen, that is, to a point where the actuator-spring 41 is balanced by the combined force of the two or more return springs 20 (as shown in Fig. 15), and the actuator stops at that point, so that further operation of the machine is impossible until the suspended type-bars are released from the actuator, which may be done by simply swinging one or both the type-bars toward the platen to release their couplers from the actuator, whereupon the actuator will idly complete its stroke and then be returned to cocked position and the released type-bars may be allowed to gravitate to rest position. In this way, the machine is virtually locked against further operation, since any operation of the keys will obviously be idle operations. As a matter of fact, the keys cannot be operated except through a small part of their stroke, since when the actuator comes to the balanced position just described, it will be immediately over the couplers that are at rest, so that if any attempt is made to raise them into actuating position they will strike against the underside of the actuator-bar. In this way, I avoid a very serious objection to the use of power mechanism for doing the work of printing, since in this type of machine it is a prime object to relieve to the fullest extent the work of the operator in manipulating the keys, thereby rendering it essential that the key-levers shall be so delicately operable that it is an easy matter to accidentally operate more than one key at a time.

As stated, the actuator-spring 41 may be strong enough to drive one type-bar only to the platen and not strong enough to drive more than one. But at the same time it is desirable to vary the power of the actuator-spring within this limit, in order that the type blow against the platen may be increased where it is desired to make more than the normal number of carbon copies or to do stenciling work. I accomplish this in a simple way by mounting the spring-supporting-shaft 40 rotatively and providing means whereby this shaft may be rotated over rearwardly to increase the tension of the spring 41 or over forwardly to decrease the tension thereof. I affix to the shaft 40 at one end a worm-gear 60 and I mesh with this gear a worm 61 mounted on the shaft 62 journaled in the frame of the machine in a position to bring its milled operating-wheel 63 within convenient reach of the operator. It will be obvious that by rotating the worm 61, the spring may be tensioned to the desired degree. A feature of importance in this adjusting device is that it is self-locking, thereby avoiding the necessity of employing extraneous locking devices. In view of the necessity of avoiding tensioning the spring beyond a predetermined maximum tension, it is important that a stop-device be provided for this tensioning mechanism. I prefer employing a spring-clip 64 which may be readily attached to the teeth of the worm-gear 60 by simply springing it over the teeth in such position as to strike against the thread of the worm 61 when the maximum tension is obtained to thus prevent the tensioning-shaft being further rotated. The idea of employing this detachable clip is to enable it to be fitted over any group of adjacent teeth of the gear, to thereby enable it to be properly positioned on the gear after the mechanism is assembled and the tension of the actuating-spring is tested. The face of the clip may be provided with numbers for indicating the degree of tension; this will be especially useful in adjusting the machine for making carbon copies.

I prefer attaching the pull-back link 46 to the actuator through the medium of a slightly resilient bar 62′ depending from the upper edge of the frame-plate of the actuator about midway the length thereof. The forward end of the pull-back link is pivotally connected to this bar near its lower end, the link passing through a hole in the frame-plate. A set-screw 63′ is tapped through the plate in a position to abut the rear edge of the bar 62′, a lock-nut 64′ being employed to hold the adjustment. By screwing the set-screw forwardly (the pull-back link 46 being unyielding), the bar 62' will bend slightly and permit the actuator-bar 36 to move rearwardly; in this way the position of the actuator-bar with respect to the couplers 18 may be nicely adjusted to give the desired impact to the type-bars. This resilient finger or bar 62' is desirably formed of sheet-metal, integral with the actuator-bar and the arms 37, 37'.

With regard to the stop or abutment 49' on the latch-lever 34, it will be observed (Fig. 9) that it is normally pulled up by a retractile spring 65 and is limited in its up-and-down movements by lugs 66. With this device, the noise and vibration due to the sudden engagement of the stop-arm 49 striking said abutment 49' is dissipated, thus contributing to the noiseless running of the machine.

I prefer connecting the couplers 18 to the heel of the type-bar in the special manner shown principally in Fig. 18. Each coupler is formed of sheet-metal with an integral side-plate 67 at one end connected to the coupler-body at the underedges thereof by a pair of integral cross-bars 68 and also by a pivot 69 for engagement with the type-bar. The space between the body of the coupler and the type-bar is sufficient to receive the heel-end of the type-bar. In this way, I provide a strong and durable connection which may be manufactured at a low cost. The rear one of the integral cross-bars serves as a convenient attaching point for retracting spring 20.

In order to insure the selector-rods 22 remaining in their slots between the guide-ears or lugs 27, I close the open ends of the slots by a curved bar 70 fastened at its ends to the curved plate carrying said ears. In addition to anchoring its ends, this bar may be secured at one or more points in its length by having one or more of the lugs 27 extended (as at 71, Fig. 8) and engaged in holes in the bar. It is desirable also that each selector-rod 22 shall be provided at its upper end with a head or lateral lug 72 to prevent withdrawal from the slot by the force of the return spring 20.

After the type-bar leaves the actuator and is on the way to the platen, it is desirable to slightly steady and cushion its action and also get a sharp return movement. To accomplish this, I arrange a leaf-spring 73 in the path of a heel-lug 74 on the type-bar, the arrangement being such that just before the type reaches the platen the heel will engage under the spring and flex its free end upwardly far enough to permit the type to print with the desired impact. These springs 73 are each desirably formed of a plurality of superposed leaves stepped as to length and fastened to the under-side of the type-bar-rest. These springs 73 are of course arranged in an arc corresponding to the type-bar-segment, and they are clamped between curved plates 76 secured to the type-bar-rest. With these springs, a quick initial return movement is insured, the action of the main return-springs 20 being thereby greatly assisted in returning the type-bars to rest.

It has been found desirable to vary the touch-resistance of the key-levers 23 in order to adjust the same to suit the idiosyncrasies of different operators. To accomplish this in a simple manner, I anchor all the selector pull-back springs 25 to a single bar 78 extending transversely of the machine and provide means for readily adjusting said bar in a vertical direction. As a means for adjusting this bar 78, I provide the same at its ends with a pair of laterally-resilient arms 79 pivotally mounted at 80 on a frame-bar 81, the forward ends of these arms being provided with depending arms 82 serrated along their inner vertical edges to engage the adjacent edge of a stationary plate 83 on the frame of the machine. By springing the arms 79 outwardly and raising or lowering them, the tension on all the springs 25 may be simultaneously varied. The saw-toothed edges of the arms 82 engaging the plate 83 serve to lock the arms in the adjusted position. The lower ends of the lock-arms 82 are provided with tabs 84 for convenience of manipulation. The plate 83 serves as a cover for the fulcrum-rods of the key-levers. The rear edge of plate 83 serves as a convenient abutment for the return-springs 85 of the key-levers. The adjustment of the springs 25 does not vary the stroke of the key-levers, they being arrested by a stop-bar 85'.

With certain characters such as the —, and X, it is desirable that the machine shall have the capacity to repeat these characters rapidly at the will of the operator, and I have accordingly provided a simple device whereby the operator may cause a repetition for as many times as desired by simply holding down the key-levers. I do this by simply providing the hook-end of the coupler 18 (as shown in Figs. 16 and 17) with a tail-finger 86 which is long enough to prevent the coupler passing off the top-end of the selector-bar when it is projected forward by the actuator-bar 36. With this device, the return of the coupler by its spring 20 will cause its cam edge 28 to again strike the release-bar 29 and push the same rearwardly and thereby immediately cause another operation of the type-bar-actuator; and this action will be repeated as long as the corresponding key is held depressed. In this connection, it will be understood that before the type-bar and its coupler return to rest position, both the type-bar-actuator and the release-bar have been reset in the position in Fig. 2 and are therefore ready for another operation.

This application is a substitute in part for my co-pending applications Serial No. 188,769, filed August 29, 1917 and Serial No. 339,017, filed Nov. 19, 1919, which applications will be subordinated to this application.

I claim:

1. In a typewriting machine, a series of type-carriers, an actuator common to all the type-carriers, a spring for actuating the actuator in its working stroke, a motor for retracting the actuator and restoring the power of said spring, and key-actuated selecting devices, said spring being strong enough to overcome the resistance offered by one of the type-carriers but not strong enough to overcome the resistance offered by more than one, whereby upon operation of more than one of the selectors the actuator will be prevented from completely operating either type-carrier sufficiently to cause a printing action.

2. In a typewriting machine, a power-actuated type-bar actuator, type-bars having pivotally-connected push-couplers extending rearwardly and each provided with a depending part having a forwardly-facing shoulder, and a rest for the couplers having a rearwardly-facing shoulder adapted to be engaged by said forwardly-facing shoulder to arrest rebound action after each printing operation.

3. In a typewriting machine, a power-actuated type-bar actuator, type-bars having pivotally-connected push couplers extending rearwardly and each provided with a depending part having a forwardly-facing shoulder, and a rest for the couplers having a rearwardly-facing shoulder adapted to be engaged by said forwardly-facing shoulder to arrest rebound action after each printing operation, the shoulder on said rest being undercut and the cooperating shoulders on the push-couplers being similarly undercut to ensure engagement.

4. In a typewriting machine, a spring-driven type-carrier actuator embodying a curved universal actuator-bar, a continuously-running motor mechanism for retracting said actuator against the action of its spring embodying a pull-back link pivotally connected to said actuator, means being provided for adjusting the curved universal actuator-bar fore and aft with respect to the type-bars without varying the stroke of the pull-back link.

5. In a typewriting machine, the combination of a plurality of pivoted, swinging type-bars and individual springs for returning them to normal at-rest position, a universal actuator-bar and a spring for imparting to said bar its working-stroke to thereby move the type-bars to the platen against the action of their said return-springs, said actuator-spring being strong enough to overcome one of the type-bar-actuator-springs but not strong enough to overcome more than one, so that operation of the type-bars will be prevented in case two or more type-bars are engaged by the actuator-bar at one time.

6. In a typewriting machine, power-driven type-carriers, said type-carriers being arranged to be disconnected from the power means and normally and freely return to rest position after each actuation, and means for preventing rebound of the freed type-carriers.

7. In a typewriting machine, power-driven type-carriers, said type-carriers being arranged to normally return to rest position after each actuation, and means for preventing rebound of the type-carriers, said means embodying a stop-shoulder common to all of these type-carriers.

8. In a typewriting machine, upwardly-swinging type-carriers each provided with a push-coupler and a spring for returning the type-bar and coupler to normal at-rest position, a power-driven actuator for engaging the selected couplers, and a rebound-preventing device adapted to engage the couplers each time the couplers return to normal, to thereby insure immediate positioning of the couplers.

9. In a typewriting machine, a power-driven actuator for operating a mechanism incident to the functioning of the machine as a typewriting machine, a latch to hold the same out of action, and a release mechanism for this latch embodying a curved universal release-bar and links for suspending said bar.

10. In a typewriting machine, a power-driven actuator for operating a mechanism incident to the functioning of the machine as a typewriting machine, a latch to hold the same out of action, and a release mechanism for this latch embodying a universal release-bar and links pivotally suspending said bars in operative position, one of said links constituting a part of the latching mechanism.

11. In a typewriting machine, a type-bar basket, each of the type-bars being provided with a rearwardly-extending coupler, a curved rest for the couplers, and guides for the couplers consisting of a series of upstanding fingers carried by said rest.

12. In a typewriting machine, a spring-actuated type-bar-actuator and a motor-driven means for retracting it against the action of its spring, said means embodying devices for arresting the actuator before the type-bars reach the printing point, and freely-moving type-bars adapted to be actuated by said actuator and to move to the printing point under momentum after said actuator is arrested.

13. In a typewriting machine, a type-basket each of whose type-bars is associated with a coupler, a curved type-bar-actuating-bar common to all the couplers, a spring for imparting a working-stroke to said type-bar-actuator, motor-driven means for retracting the actuator against the action of said spring to thus put the spring under tension, said means being constructed to positively limit the length of the actuating-stroke of the actuator-bar to carry the type-bar to a point short of the printing point to thereby permit the type-bar to fly by momentum to the printing point.

14. In a typewriting machine, a series of type-carriers, an actuator therefor and power means for operating the actuator, a latch for holding the actuator against operation, and key-operated means for releasing the latch embodying a curved universal release-bar and means for supporting the same consisting of depending parallel links, for the purpose set forth.

15. In a typewriting machine, a universal actuator for actuating the type-carriers, a spring for imparting a working-stroke to said actuator, a shaft around which said spring is coiled, one end of the spring being attached to the shaft and the other end being connected to the actuator, and means for varying the tension of said spring by rotating said shaft.

16. In a typewriting machine, a universal actuator for actuating the type-bars, a spring for imparting the working-stroke to said actuator, and means for varying the tension of said spring, said means embodying self-locking gearing.

17. In a typewriting machine, a universal actuator for actuating the type-bars, a spring for imparting the working-stroke to said actuator, and means for varying the tension of said spring, said means embodying self-locking gearing, said means also embodying an adjustable tension-arresting device.

18. In a typewriting machine, a spring-actuated actuator for actuating one of the mechanisms of the machine, a pull-back mechanism operated by a motor-driven shaft in continuous operation and embodying an independent shaft arranged in alinement with the motor-driven shaft and being permanently coupled to said actuator, mechanism being provided for temporarily connecting it to said motor-driven shaft during the operation of the pull-back mechanism.

19. In a typewriting machine, a spring-actuated actuator adapted to operate one of the mechanisms of the machine, a motor-driven pull-back mechanism embodying a continuously-running shaft carrying a ratchet-wheel, and an independent shaft connected to the actuator and carrying means adapted for engagement with the ratchet-wheel while the pull-back mechanism is in action.

20. In a typewriting machine, the combination of type-bars, a universal type-bar-actuator, key-operated selecting devices for operatively connecting the type-bars with the actuator, spring means tending to normally impart a working-stroke to said actuator, means for locking the actuator in retracted position, means controlled by the act of connecting a type-bar with the actuator for releasing the actuator, power mechanism for retracting the actuator and storing power in said spring means, and means for automatically putting said retracting mechanism into operation before a type-bar connected with the actuator reaches the printing point and after sufficient momentum has been imparted to the type-bar to carry it to the printing point.

21. In a typewriting machine, the combination of type-bars, a universal type-bar-actuator, key-operated selecting devices for operatively connecting the type-bars with the actuator, spring means tending to normally impart a working-stroke to said actuator, means for locking the actuator in retracted position, means controlled by the act of connecting a type-bar with the actuator for releasing the actuator, power mechanism for retracting the actuator and storing power in said spring means, means for automatically putting said retracting mechanism into operation before a type-bar connected with the actuator reaches the printing point and after sufficient momentum has been imparted to the type-bar to carry it to the printing point, and individual springs for restoring the type-bars to normal position, said individual springs having sufficient tension to stall the actuator before it reaches the end of its working-stroke when more than one type-bar at a time is connected with the actuator to thereby prevent a printing-stroke of either connected type-bar.

22. In a typewriting machine, the combination of type-bars, rebound means for normally locking the type-bars against movement in printing direction in their at-rest position, a universal type-bar-actuator, key-operated selecting devices for releasing the type-bars and operatively connecting them with said actuator, and power-operated mechanism controlled by said selecting devices for causing a single working and return stroke of said actuator.

23. In a typewriting machine, the combination of type-bars, rebound means for normally locking the type-bars against movement in printing direction in their at-rest position, a universal type-bar-actuator, key-operated selecting devices for releasing the type-bars and operatively connecting them with said actuator, spring means tending to normally impart a working-stroke to the actuator, means for locking the actuator in retracted position, and means controlled by said selecting devices for releasing the actuator, power mechanism for retracting the actuator and storing power in said spring means, and means for automatically throwing said retracting mechanism into action before a type-bar connected with the actuator reaches the printing point and after sufficient momentum has been imparted to the type-bar to carry it to the printing point.

24. In a typewriting machine, the combination of type-carriers, a universal type-carrier-actuator-bar, spring-operated mechanism for imparting a working-stroke to said actuator-bar of sufficient power to move only one type-carrier to the printing point at one operation of the actuator, means for locking the actuator in retracted position against the tension of said spring-operated mechanism, shiftable couplers connected with the type-bars and free from said actuator, key-operated selecting devices for shifting said couplers into the path of the actuator, means controlled by the operation of either of said selecting devices for releasing the actuator, and power-operated mechanism for retracting the actuator against the tension of said spring-operated mechanism.

25. In a typewriting machine, the combination of type-carriers, a universal type-carrier-actuator, spring-operated mechanism for imparting a working-stroke to said actuator of sufficient power to move only one type-carrier to the printing point at one operation of the actuator, means for locking the actuator in retracted position against the tension of said spring-operated mechanism, shiftable couplers connected with the type-bars and free from said actuator, key-operated selecting devices for shifting said couplers into the path of the actuator, means controlled by the operation of either of said selecting devices for releasing the actuator, power-operated mechanism for retracting the actuator against the tension of said spring-operated mechanism, said retracting mechanism being constructed so as to limit the extent of the working-stroke of the actuator to less than that sufficient to maintain the actuator and couplers in engagement until the type-carrier reaches the printing point.

26. In a typewriting machine, the combination of type-carriers, a universal type-carrier-actuator, spring-operated mechanism for imparting a working-stroke to said actuator of sufficient power to move only one type-carrier to the printing point at one operation of the actuator, means for locking the actuator in retracted position against the tension of said spring-operated mechanism, shiftable couplers connected with the type-bars and free from said actuator, key-operated selecting devices for shifting said couplers into the path of the actuator, means controlled by the operation of either of said selecting devices for releasing the actuator, power-operated mechanism for retracting the actuator against the tension of said spring-operated mechanism, and means for throwing said retracting mechanism into action before the type-carriers reach printing position to relieve the pressure of the actuator on the couplers and type-carriers.

27. In a typewriting machine, the combination of type-carriers, a universal type-carrier-actuator, spring-operated mechanism for imparting a working-stroke to said actuator of sufficient power to move only one type-carrier to the printing point at one operation of the actuator, means for locking the actuator in retracted position against the tension of said spring-operated mechanism, shiftable couplers connected with the type-bars and free from said actuator, key-operated selecting devices for shifting said couplers into the path of the actuator, means controlled by the operation of either of said selecting devices for releasing the actuator, power-operated mechanism for retracting the actuator against the tension of said spring-operated mechanism, means for varying the tension of said spring-operated mechanism, and means cooperating with said tension-varying means for limiting the maximum degree of tension to less than that sufficient to permit movement of two or more type-carriers to printing position at one operation of the actuator.

28. In a typewriting machine, a power-driven type-actuator, a key-actuated release mechanism therefor, and means whereby the holding of the key depressed will automatically cause repeated actions of the release mechanism to thereby cause repeated printing of the same character.

29. In a typewriting machine, a spring-driven type-bar-actuator, means for retracting and latching it, key-actuated releasing means, and devices whereby by holding down the key the return of the type-bar toward rest position will actuate said release mechanism to thereby cause a repeat action of the same type-bar.

30. In a typewriting machine, a spring-driven type-bar-actuator, means for retracting and latching it, key-actuated releasing means, and devices whereby by holding down the key the return of the type-bar toward rest position will actuate said release mechanism to thereby cause a repeat action of the same type-bar, said devices embodying a member attached to the type-bar and adapted to engage a member of the release mechanism.

31. In a typewriting machine, a spring-driven type-bar-actuator, means for retracting and latching it, key-actuated releasing means, and devices whereby by holding down the key the return of the type-bar toward rest position will actuate said release mechanism to thereby cause a repeat action of the same type-bar, said devices embodying a member pivotally connected to the type-bar and adapted to be held by the key means in the path of the trip-member of the releasing mechanism.

32. In a typewriting machine, a spring-driven type-bar-actuator, means for retracting and latching it, key-actuated releasing means, and devices whereby by holding down the key the return of the type-bar toward rest position will actuate said release mechanism to thereby cause a repeat action of the same type-bar, said devices embodying a push-coupler connected to the type-bar and having a tail piece adapted to be engaged and held up in operative position by a member of the key means as long as the key is held depressed.

33. In a typewriting machine, a spring-actuated type-bar-actuator, power means for restoring it after each action, a latching means, key-controlled vertically-movable bars for actuating the latching mechanism, type-bars each carrying a pivoted rearwardly-extending push-coupler having a cam-edge for actuating the release mechanism and also a rearwardly-extending tail-lug for engagement with the top-end of one of the aforesaid bars, and spring normally tending to return the type-bars and hold the tail-lugs and the couplers on the top-ends of said bars, for the purpose set forth.

34. In a typewriting machine, a power-driven actuator embodying a bar for actuating the type-bars, motor-driven positive mechanism for retracting it embodying a pull-back-link, means connecting the link to the actuator-bar, said connecting means being adjustable in order to vary the position of the actuator-bar with respect to the type-bar without varying the throw of the pull-back-link.

35. In a typewriting machine, a power-driven actuator embodying a bar for actuating the type-bars, motor-driven positive mechanism for retracting it embodying a pull-back-link, means connecting the link to the actuator-bar, said connecting means being adjustable in order to vary the position of the actuator-bar with respect to the type-bar without varying the throw of the pull-back-link, said connecting means being also resilient.

36. In a typewriting machine, a power-driven actuator embodying a bar for actuating the type-bars, motor-driven positive mechanism for retracting it embodying a pull-back-link, means connecting the link to the actuator-bar, said connecting means being adjustable in order to vary the position of the actuator-bar with respect to the type-bar without varying the throw of the pull-back-link, said connecting means embodying a member resiliently connected to the actuator-bar and an adjusting screw mounted on the actuator-bar.

37. In a typewriting machine, a spring-actuated type-bar-actuator consisting of a curved actuator-bar structure and means for swingingly suspending it, a power-driven mechanism for retracting the type-bar-actuator against its spring embodying a pull-back-link having its forward end connected to said curved bar structure, this connection consisting of a flat resilient member depending from the upper edge of the curved bar structure, a pivot connecting the pull-back-link to the side of said member, and a set-screw mounted on the curved bar structure and having its forward end abutting the rear edge of the depending member at a point below said pivot.

38. In a typewriting machine, a power-driven type-bar-actuating means embodying two pairs of depending oscillatable arms and an actuator-bar structure pivotally supported thereon and embodying a curved bar and two pairs of oppositely extending integral arms pivotally connected to the respective pairs of said arms.

39. In a typewriting machine, a spring-actuated type-bar-actuator, a motor-driven retracting mechanism embodying a stop-arm, a latch carrying a spring-actuated stop-lug to receive the impact of said stop-arm, and key-actuated means for releasing said latch.

40. In a typewriting machine, a spring-actuated type-carrier-actuator and means for tensioning said spring embodying a worm and a gear, and a stop-clip adapted to be removably clasped upon any plurality of adjacent teeth of said gear to thereby vary the maximum tension.

41. In a typewriting machine, power means for throwing the type-bars to the platen with a flying action, and spring means for engaging the type-bars as they approach the platen to thus cushion the blow and insure a quick return of the type-bars, said spring means consisting of a series of leaf-springs carried by the type-bar-rest.

42. In a typewriting machine, power means for throwing the type-bars to the platen with a flying action, and spring means for engaging the type-bars as they approach the platen to thus cushion the blow and insure a quick return of the type-bars, said spring means consisting of a series of leaf-springs carried by the type-bar-rest, each of the type-bars being provided with a heel-lug adapted to engage under said leaf-springs.

43. In a typewriting machine, a spring-actuated type-carrier-actuator, means for retracting and latching it, release means, and key-actuated devices for actuating the release means embodying return-springs and devices for simultaneously varying the tension of said springs to thereby vary the touch-resistance of the keys without varying the stroke of the keys, said devices embodying a transverse bar connected to all the springs, resilient pivoted arms connected to the bar and carrying toothed latch-arms, and means for engaging the teeth of said arms to hold them in their adjusted position.

44. In a typewriting machine, a spring-actuated type-bar-actuator, means for retracting it, a releasing means, key-actuated vertical rods for actuating the releasing means, type-bars and couplers, and means for guiding the upper ends of said rods consisting of a curved series of serrated rearwardly-extending fingers mounted on the frame, and a curved bar removably fastened to the rear ends of said fingers to close the guide-slots between the fingers.

In testimony whereof I hereunto affix my signature.

MANSFIELD C. CRAWLEY.